United States Patent
Powers (10) Patent No.: US 7,590,848 B2
(45) Date of Patent: Sep. 15, 2009

(54) SYSTEM AND METHOD FOR AUTHENTICATION AND FAIL-SAFE TRANSMISSION OF SAFETY MESSAGES

(75) Inventor: Leslie Powers, Irvine, CA (US)

(73) Assignee: Blackhawk Network, Pleasanton, CA (US)

( * ) Notice: Subject to any disclaimer, the term of this patent is extended or adjusted under 35 U.S.C. 154(b) by 1222 days.

(21) Appl. No.: 10/360,896

(22) Filed: Feb. 7, 2003

(65) Prior Publication Data

US 2004/0059917 A1  Mar. 25, 2004

Related U.S. Application Data

(60) Provisional application No. 60/355,282, filed on Feb. 7, 2002.

(51) Int. Cl.
H04L 9/00 (2006.01)

(52) U.S. Cl. ..................................................... 713/176
(58) Field of Classification Search ................. 713/176, 713/178, 180, 181, 189, 194; 600/323; 726/22, 726/23
See application file for complete search history.

(56) References Cited

U.S. PATENT DOCUMENTS

| | | | |
|---|---|---|---|
| 5,511,122 A | 4/1996 | Atkinson | |
| 6,078,909 A | 6/2000 | Knutson | |
| 6,119,228 A | 9/2000 | Angelo et al. | |
| 6,198,824 B1 | 3/2001 | Shambroom | |
| 6,591,123 B2 * | 7/2003 | Fein et al. | 600/323 |
| 6,708,049 B1 * | 3/2004 | Berson et al. | 600/323 |
| 7,048,687 B1 * | 5/2006 | Reuss et al. | 600/300 |
| 2001/0056516 A1 | 12/2001 | Schollenberger | |
| 2002/0010874 A1 * | 1/2002 | Barthel | 714/4 |
| 2002/0184157 A1 | 12/2002 | Pauschinger | |
| 2004/0107345 A1 | 6/2004 | Brandt et al. | |

FOREIGN PATENT DOCUMENTS

| | | |
|---|---|---|
| EP | 1 107 079 A2 | 6/2001 |
| WO | WO 94/26571 | 11/1994 |
| WO | WO 01/22873 A1 | 4/2001 |
| WO | WO 01/26334 | 4/2001 |

OTHER PUBLICATIONS

PROFIBUS Technical Description, Order-No. 4.002, Sep. 1999.
Summers, Angela E., P.E., "Understanding Safety Integrity Levels," SIS-TECH Solutions (2000).

(Continued)

*Primary Examiner*—Beemnet W Dada
(74) *Attorney, Agent, or Firm*—Cooley Godward Kronish LLP (57) ABSTRACT

A system and method for fail-safe transmission of safety messages through communication channels containing non-safety-certified equipment is disclosed herein. Consistent with the disclosed method, digital signatures and/or encryption are used to authenticate both the origin and content of the safety messages. A watchdog timer ensures transition to a safe state if authenticated messages are not received periodically. In a particular implementation, the disclosed method includes generating a safety message indicating the state of a sensor. A digital signature is then generated to sign this safety message. The method further includes communicating the safety message and the digital signature to an actuator. Upon receipt, the safety message is authenticated using the digital signature. A watchdog timer ensures transition to a safe state if authenticated messages are not received periodically.

36 Claims, 3 Drawing Sheets

OTHER PUBLICATIONS

Summers, Angela E., Ph.D., "Techniques for Assigning A Target Safety Integrity Level," ISA Transactions 37:95-104 (1998).

Stavrianidis, Paris, "What Regulations and Standards Apply to Safety Instrumented Systems?" Control Engineering.Online (2000).

Power and Control Journal—No. 12, 1-28 (2000).

The Notification of Transmittal of The International Search Report or the Declaration, date of mailing May 23, 2002.

Siemans Automation & Drives, "Safety network compatible with existing bus types," Mar. 2001.

Siemans Automation & Drives, "Safety Integrated Systems: an overview," Mar. 2001.

* cited by examiner

SYSTEM AND METHOD FOR AUTHENTICATION AND FAIL-SAFE TRANSMISSION OF SAFETY MESSAGES

CROSS-REFERENCE TO RELATED APPLICATIONS

This application claims priority under 35 U.S.C. §119(e) to U.S. Provisional Application No. 60/355,282, filed Feb. 7, 2002 entitled SYSTEM AND METHOD FOR AUTHENTICATION AND SECURE TRANSMISSION OF SAFETY MESSAGES, which is incorporated by reference herein in its entirety.

FIELD OF THE INVENTION

This invention relates to the general field of safety busses and distributed safety systems and, in particular, to a system and method for fail-safe communication of safety messages among field devices.

BACKGROUND OF THE INVENTION

Within distributed safety systems, sensing devices will typically periodically issue safety messages to an associated actuator regarding the states of various sensors. Appropriate response to such safety messages is necessary to ensure optimal and safe operation. For example, in the event a safety message indicates a condition has arisen which may lead to catastrophic failure and unsafe operation unless corrected, it is necessary that the appropriate corrective action (e.g., valve shutoff) actually be taken.

In these distributed safety systems, certain bus integrity methods may be used in an attempt to ensure better or more reliable communication of the safety information over the applicable data bus. These methods have included various error checking and coding schemes for detecting and correcting data errors arising within the data communicated via the data bus. For example, a safety message may contain a check sum or cyclic redundancy code (CRC) to detect bit errors. In addition, while particular bus systems, such as the Process Field Bus ("PROFIBUS") communication protocol and system, may employ various error coding methods in order to identify erroneous data, such systems are generally unsuitable for applications involving safety messages.

Moreover, the increasing automation of network-based industrial processes and control systems has rendered such systems vulnerable to attack by computer "hackers", i.e., those individuals engaging in malicious code breaking. For example, it is conceivable that hackers may attempt to disrupt process operation by falsely emulating or interfering with the various safety messages transmitted among a distributed arrangement of sensors and actuators. In extreme circumstances, such interference could result in unsafe process operation and potentially dire attendant consequences.

SUMMARY OF THE INVENTION

In summary, the present invention pertains to a system and method for transmitting safety messages by way of communication channels containing non-safety-certified equipment. Consistent with the disclosed method, digital signatures and/or encryption may be used to authenticate both the origin and content of the transmitted safety messages. In particular, the present invention leverages digital signature technology and "watchdog" timers to ensure that safety messages are fail-safe, even when transmitted through non-safety-certified equipment.

The present invention relates to a method for fail-safe transmission of safety messages in a network environment. The method includes generating a safety message that indicates the state of a sensor. A digital signature is then generated to sign this safety message. The method further includes communicating the safety message and the digital signature between network nodes. Upon receipt, the safety message may be authenticated using the digital signature and watchdog timers.

In a particular implementation the present invention is directed to a system in which a sending field device creates a safety message, "signs" the message with a digital signature, and sends the message to another field device via a communications network. The receiving field device "verifies" the digital signature to authenticate both the origin and the content of the safety message. In addition, the receiving field device uses a watchdog timer to verify periodic reception of the safety messages. Creation, signing, and verification of the safety message are effected in safety-certified layers within the transmitting field device, even though the intervening communications network may consist of non-safety-certified commercial off the shelf (C.O.T.S.) elements.

This implementation may be exemplified by considering the case in which the transmitting field device comprises an intelligent pressure transducer and the receiving field device comprises an intelligent safety shutoff valve. In this case it is desired to shut off the valve if the monitored pressure exceeds some predefined limit. A safety application in the intelligent pressure transducer periodically sends a safety message indicating that the pressure is still within an acceptable range. A corresponding safety application in the intelligent shutoff valve expects to receive safety messages periodically. If the safety application associated with the valve does not receive a valid message within a predetermined timeout period maintained by a "watchdog timer", then the valve shuts off. In accordance with the invention, the reliability of this process is enhanced through use of safety-certified elements within the pressure transducer and valve, even though the intervening communications network need not and generally will not be safety-certified.

BRIEF DESCRIPTION OF THE DRAWINGS

For a better understanding of the nature of the features of the invention, reference should be made to the following detailed description taken in conjunction with the accompanying drawings, in which.

DETAILED DESCRIPTION OF THE INVENTION

Figure 1:
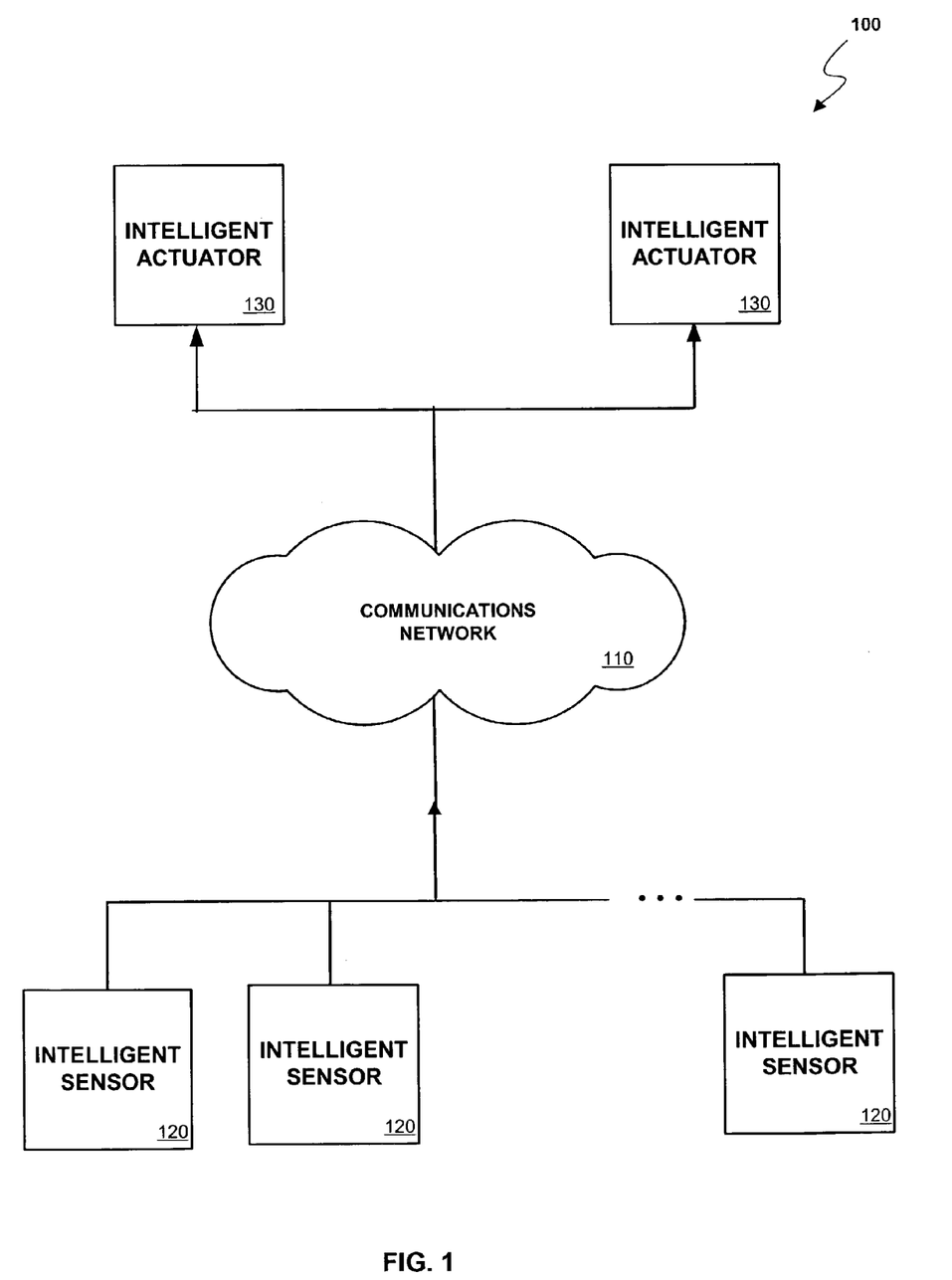
FIG. 1 is a block diagram of an exemplary industrial system in which a distributed safety system in accordance with the invention is implemented.

FIG. 1 is a block diagram of an exemplary industrial system 100 in which a distributed safety system in accordance with the invention is implemented. The system 100 includes a plurality of intelligent sensors 120 in communication with a set of intelligent actuators 130 via a communications network 110. In operation, each of the intelligent actuators 130 receives data in the form of "safety messages" from one or more of the intelligent sensors 120. The applicable intelligent actuator 130 then responds by performing an appropriate action (e.g., opening/closing a valve or switch).

As is described below, the present invention contemplates using digital signatures and/or encryption, in conjunction with watchdog timers, to enhance the security and reliability of distributed safety systems. In accordance with this embodiment, a "safety layer" within an intelligent sensor 120 creates a safety message, "signs" the safety message to create a digital signature, and sends the message and digital signature to an intelligent actuator 130 via the communications network 110. A corresponding safety layer within the intelligent actuator 130 "verifies" the digital signature to authenticate both the origin and the content of the safety message. In addition, the safety layer uses a watchdog timer to verify periodic reception of the safety messages. Advantageously, creation, signing, and verification of the safety message is performed in safety-certified layers of the applicable intelligent sensor 120 and intelligent actuator 130, even though the communications network 110 may consist of non-safety-certified commercial off the shelf (C.O.T.S.) elements.

As an example, consider an embodiment in which the intelligent sensor 120 comprises an intelligent pressure transducer and the intelligent actuator 130 comprises an intelligent safety shutoff valve in the distributed safety system of FIG. 1. In this case it is desired to shut off the valve if the monitored pressure exceeds some predefined limit. A safety application in the intelligent pressure transducer periodically sends a safety message indicating that the pressure is still within an acceptable range. In this embodiment a corresponding safety application in the intelligent shutoff valve expects to receive safety messages periodically. If the safety application associated with the valve does not receive a valid message within a predetermined timeout period, then the valve shuts off. In accordance with the invention, the reliability of this process is enhanced through use of safety-certified elements within the pressure transducer and valve, even though the intervening communications network need not and generally will not be safety-certified.

Figure 2:
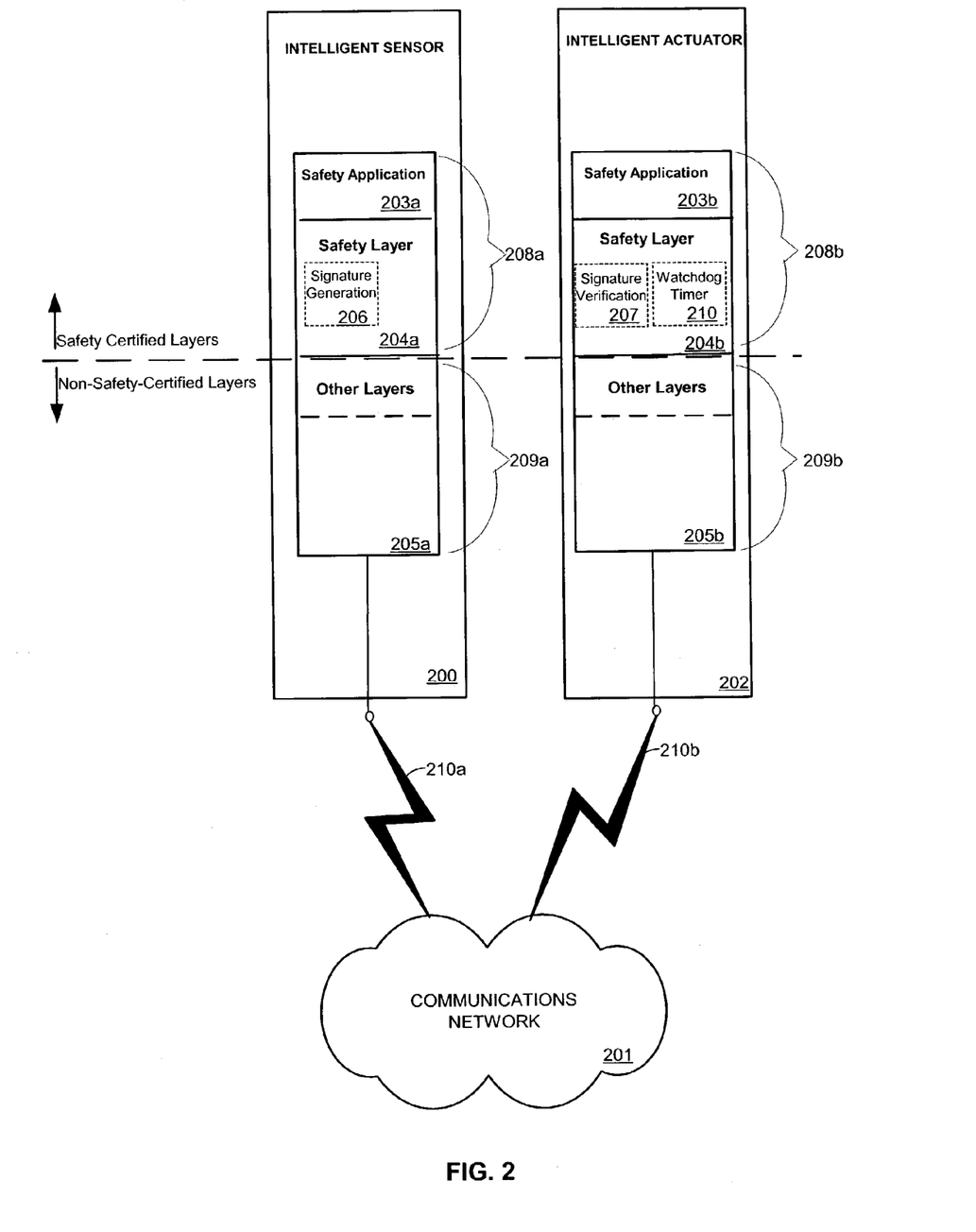
FIG. 2 depicts an intelligent sensor configured to send safety messages through a communications network to an intelligent actuator.

Turning now to FIG. 2, there is shown a block diagrammatic representation of an exemplary implementation of an intelligent sensor 200 and an intelligent actuator 202 in accordance with the present invention. In the embodiment of FIG. 2, the intelligent sensor 200 includes a safety application 203a and safety layer 204a which collectively create "safety messages" indicative of the current state of the sensor 200. Each such safety message is sent by the intelligent sensor 200 through a communications network 201 to the intelligent actuator 202. In accordance with the invention, the safety layer 204a generates a digital signature 206 for the safety message or a message digest derived therefrom. The corresponding safety layer 204b of the actuator 202 "verifies" 207 the digital signature to authenticate both the origin and the content of the safety message. The safety layer 204b will also contain a watchdog timer 210 enabling verification that valid safety messages are periodically received. Each safety layer 204 generally implements one of a variety of encryption algorithms (described below), which are preferably stored in a non-volatile manner and permanently write-protected to discourage tampering.

In a particular embodiment, the intelligent sensor 200 could be implemented using, for example, an intelligent pressure, temperature or flow transducer, and the intelligent actuator 202 could be realized as a safety shutoff valve or switch. Intelligent field devices of this type may be realized using, for example, various I/A Series® devices available from the Invensys Foxboro unit of Invensys plc, as modified consistent with the teachings herein. The communications network 201 could be realized as an Ethernet network or as a FOUNDATION Fieldbus network available from Invensys Foxboro. The FOUNDATION Fieldbus is an all digital, serial, two-way communication system which interconnects field devices, such as transmitters, actuators, and controllers. It functions as a Local Area Network (LAN) with built-in capability to distribute control application across the network.

Although the embodiment of FIG. 1 is specific to the context of intelligent sensors and actuators in order to facilitate explanation of the principles of the invention, in other embodiments the network node generating the safety message (i.e., the "source node") and the network node receiving the safety message (i.e., the "destination node") may be comprised of electronic devices (e.g., controllers, routers, workstations) lacking sensors or actuators. For example, in certain industrial or transportation applications the source node could include a switch or the like configured with appropriate transmission capabilities. Similarly, the destination node could comprise a controller or workstation outfitted with a conventional network interface. In addition, in certain embodiments safety messages may be transmitted from a source node through a communications network to a controller, and then forwarded from the controller to another network node. As may be appreciated by those skilled in the art, each of these embodiments is within the spirit and scope of the present invention described herein.

As shown in FIG. 2, in addition to the safety application 203a and the safety layer 204a, the intelligent sensor 200 further includes a plurality of communication layers 205a. The safety application 203a, safety layer 204a and communication layers 205a may each be implemented in hardware, firmware, software, or some combination thereof. The intelligent actuator 202 similarly includes a plurality of communication layers 205b in addition to the safety application 203b and safety layer 204b. Each of the layers within the actuator 202 may also be implemented in hardware, firmware, software, or some combination thereof.

As is indicated by FIG. 2, the various functional elements of the intelligent sensor 200 are bifurcated into a safety-certified portion 208a and a non-safety-certified portion 209a. In this regard the safety-certified portion 208a includes a safety application 203a and safety layer 204a, while the non-safety-certified portion 209a includes the communication layer 205a. Similarly, the intelligent actuator 202 is bifurcated into a safety-certified portion 208b and a non-safety-certified portion 209b. As shown, the safety-certified portion 208b includes a safety application 203b and safety layer 204b, while the non-safety-certified portion 209b includes the communication layer 205b.

As used herein, the term "safety-certified" indicates that the applicable layer or component has been certified by an authorized organization as being compliant with one or more pertinent international or industry standards. For example, the International Electrotechnical Commission (IEC, Geneva, Switzerland) has promulgated the IEC 61508 in support of the use of Safety Instrumented Systems (SISs) as a means of protecting against hazardous events. SISs are composed of sensors, logic solvers, and final control elements assembled for the purpose of transitioning a process to a "safe" or otherwise stable state when predetermined conditions are violated. Other terms commonly used to describe SISs include emergency shutdown systems, safety shutdown systems, and safety interlock systems. Various commercial organizations provide "safety-certified" certification marks and certificates evidencing compliance with applicable international standards, such as IEC 61508. As is discussed below, it is a feature of the present invention that the neither the elements of the communication layers 205a, 205b, nor of the communication network 201, are required to be safety-certified in order to ensure the authenticity of the safety messages produced by the intelligent sensor 200 and received by the intelligent actuator 202.

During operation of the intelligent sensor 200, the safety application 203a monitors its state and periodically produces a corresponding safety message. The safety layer 204a then adds various safety measures to the safety message. Such safety measures include a message sequence number, time stamp or the equivalent in order to ensure that successive safety message are distinguishable. This prevents a potentially malicious third party (e.g., a "hacker") from simply copying one of the safety messages and sending the copy periodically. Additional measures may include, for example, source, destination, and CRC information. As indicated above, the safety layer 204a then "signs" 206 the safety message, or a message digest derived therefrom, in order to create an associated digital signature.

The communications network 201 transports each safety message and associated digital signature generated by the intelligent sensor 200 to the intelligent actuator 202. In the exemplary embodiment the communications network 201 may be comprised of commercial-off-the-shelf (C.O.T.S.) equipment that is not safety-certified. As shown, the communications network 201 interfaces with communication layers 205a and 205b of the intelligent sensor 200 and intelligent actuator 202, respectively, which are also not safety certified (i.e., are included within the non-safety-certified layers 209a and 209b of the intelligent sensor 200 and intelligent actuator 202, respectively).

Upon receipt at the intelligent actuator 202 of a safety message and associated digital signature produced by the intelligent sensor 200, the safety layer 204b verifies 207 the received digital signature to authenticate both the origin and the content of the safety message. In addition, the safety layer 204b verifies the safety measures, which may include sequence number, time stamp, source, destination, and CRC. The safety layer 204b will also contain one or more watchdog timers 210 facilitating detection of the loss of periodic receipt of safety messages. In the exemplary embodiment the safety application 203b of the intelligent actuator 202 monitors the received safety messages and performs some safety action (e.g., changes the ON/OFF state of a valve) if the safety messages indicate an unsafe condition. The safety application 203b is also configured to undertake some prescribed action if the safety application 203b does not receive a valid safety message within the required timeout period.

As is discussed below, signature generation 206 involves generating a digital signature by applying a private key of a private/public key pair associated with the intelligent sensor 200 to a condensed version of a safety message (i.e., a message digest). In order to preserve security, the private key is preferably kept in confidence and securely stored within the safety layer 204a. The resulting digital signature and the safety message are then transmitted to the intelligent actuator 202 via the non-certified communications network 201. Within the intelligent actuator 202, a recovered message digest is computed using the safety message received via the communications network 201. Using this recovered message digest and a public key of the intelligent sensor 200, the signature verification module 207 generates another digital signature for comparison with the digital signature originally created by the intelligent sensor 200. If these digital signatures are the same, the safety message received at the intelligent actuator 202 is presumed valid and may be processed accordingly; if not, the received safety message is deemed invalid or corrupted and discarded.

Signature Generation and Verification

Figure 3:
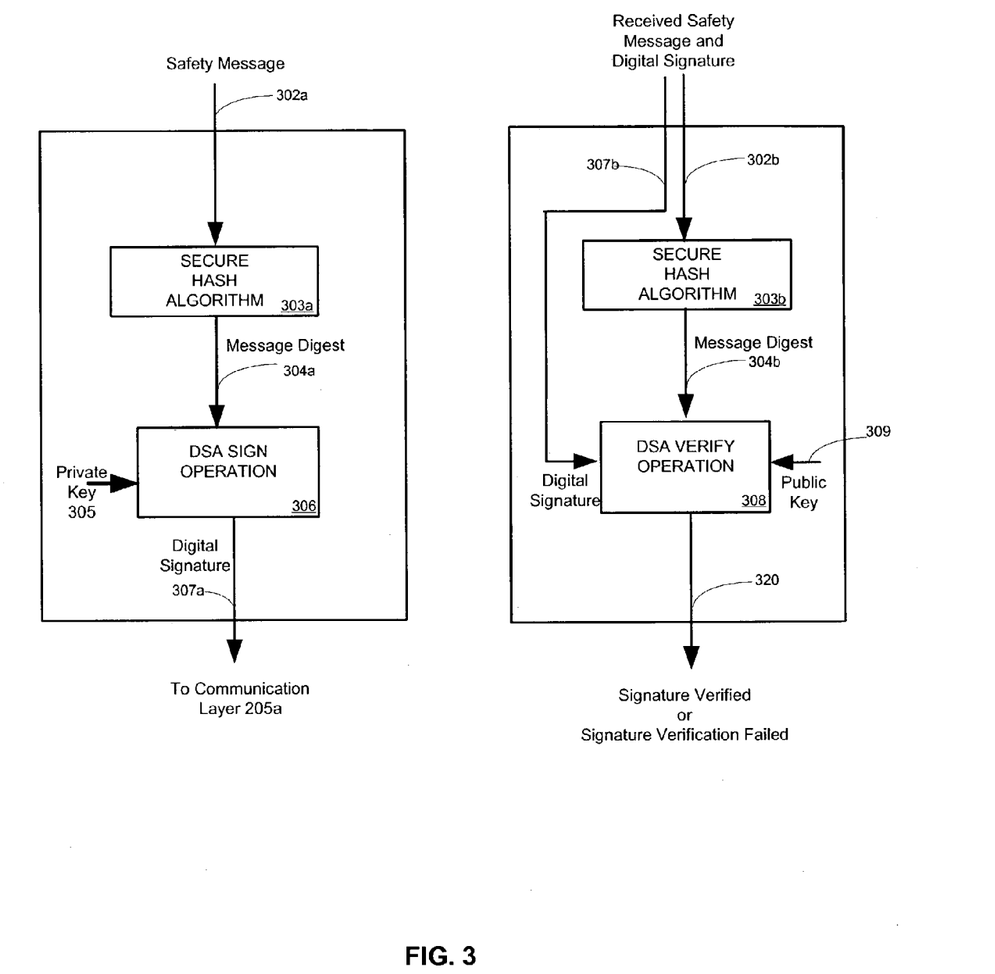
FIG. 3 is a block diagram representative of the operations performed during signature generation and signature verification in accordance with the invention.

FIG. 3 is a block diagram representative of the operations performed during signature generation 206 and signature verification 207. In the exemplary embodiment of FIG. 3, signature generation 206 and signature verification 207 is conducted in accordance with the Digital Signature Algorithm (DSA) to generate and verify digital signatures based upon safety messages, respectively. In this regard the Digital Signature Standard (DSS), Federal Information & Processing Standard Publication (FIPS) PUB 186, specifies the Digital Signature Algorithm, which comprises a known public key algorithm used for digital signatures. Other cryptographic algorithms of potential utility in connection with the present invention are DES (Data Encryption Standard) and RSA. DES is a symmetric algorithm with a fixed key length, while RSA is a public key algorithm that can be used for both encryption and digital signatures.

Turning now to FIG. 3, the safety layer 204a of the sensor 200 generates and provides a safety message 302a to a secure hash algorithm (SHA) 303a. The SHA 303a condenses the safety message 302a to a condensed version termed a message digest 304a. This hash algorithm may comprise the Secure Hash Algorithm (SHA-1) as specified in the Secure Hash Standard (SHS), FIPS PUB 180-1, National Institute of Standards & Technology, 1995, which is consistent with the Digital Signature Standard. As shown, a digital signature 307 is then generated on the basis of the private key 305 of the sensor 200 and the message digest 304 through execution of a DSA Sign Operation 306. The digital signature 307a and safety message 302a are then transmitted to the intelligent actuator 202 via the communications network 201.

As mentioned above, FIG. 3 also illustratively represents the operations performed during signature verification 207 in the actuator 202. This verification 207 involves verifying the digital signature generated during the signature generation 206 occurring within the intelligent sensor 200. A secure hash algorithm 303b condenses the received message 302b to a recovered message digest 304b. A DSA verify operation 308 then verifies the digital signature 307b given the message digest 304b and the public key 309 associated with the intelligent sensor 200. The result 320 of the DSA verify operation 308 is either "signature verified" or "signature verification failed", thereby indicating whether or not the received message 302b has been authenticated by virtue of its digital signature 307b.

Simplified Exemplary Representation

In a particular exemplary embodiment, the present invention may be applied to the case in which the intelligent sensor 200 comprises a manual shutdown switch and the intelligent actuator 202 comprises an associated valve. In this embodiment the switch has two positions, RUN and SHUTDOWN. If the position of the switch is SHUTDOWN and the valve does not close, then potentially dangerous consequences may ensue.

During normal operation, the shutdown switch periodically sends an "encrypted watchdog" message (i.e., an encrypted safety message) to the valve, indicating that the switch is in the RUN position. The valve expects to periodically receive the encrypted watchdog message, and closes if the message is not received. The message is changed each time it is transmitted, perhaps by including a sequence number or a time stamp. Encryption of the watchdog message may be effected by, for example, using one of the encryption algorithms described above.

There are a variety of potential ways to maintain the private key used in encrypting the watchdog message in secrecy. One extreme approach might be to set private key for the switch at the time of its manufacture, and not allow (by quality control) the private key to be communicated from the applicable manufacturing facility. The valve is configured with the corresponding public key, which need not be kept in secrecy.

Of course, in alternative embodiments of the present invention more complicated logic may be employed to determine an appropriate course of action to be taken on the basis of encrypted watchdog messages generated consistent with the invention. For example, configurations could be provided in which the encrypted messages received from any of several sensors could cause closure of a valve, or in which messages from m out of n sensors could lead to closure of such a valve. Moreover, the safety messages generated by each intelligent sensor may be encrypted prior to transmission to an intelligent actuator. The encrypted safety messages received at each actuator would then be decrypted prior to being processed in the manner described above, thereby further discouraging tampering with or "hacking" of the transmitted safety messages.

Accordingly, a method has been described herein for transmitting safety messages by way of communication channels comprised of non-safety-certified equipment. Consistent with the disclosed method, digital signatures may be used to authenticate both the origin and content of the transmitted safety messages. In other embodiments data encryption may be employed instead of digital signatures in connection with message authentication. In yet other embodiments data encryption may be used in addition to digital signatures in order to effect such authentication.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following claims and their equivalents define the scope of the invention.

What is claimed is:

1. A system for fail-safe transmission of safety messages in a network environment, said system comprising:
   an intelligent sensor apparatus including a sensor, a sensor processor, and a sensor computer readable media including instructions to implement:
   a first safety-certified application;
   a first safety-certified layer; and
   a first non-safety-certified layer wherein said first safety-certified layer is operative to generate a safety message and associated digital signature based upon state information received from said sensor; and
   an intelligent actuator apparatus disposed to receive said safety message and said digital signature via a communications network communcatively coupled to said intelligent sensor apparatus, said intelligent actuator apparatus including an actuator, an actuator processor, and an actuator computer readable media including instructions to implement:
   a second safety-certified application;
   a second safety-certified layer; and
   a second non-safety-certified layer wherein said second safety-certified layer is operative to use said digital signature in order to verify authenticity of said safety message and thereby enable said actuator to perform an action in accordance with said state information.

2. The system of claim 1 wherein said sensor computer readable medium includes instructions to generate, in said first safety-certified layer, said digital signature by signing said safety message using a private key associated with said sensor, said digital signature being verifiable using a public key corresponding to said private key.

3. The system of claim 2 wherein said actuator computer readable medium includes instructions to verify said digital signature using said public key.

4. The system of claim 1 wherein said sensor computer readable medium includes instructions to generate said digital signature by:
   generating a message digest, said message digest generated by condensing said safety message using a hash function; and
   signing said message digest using a private key.

5. The system of claim 4 wherein said actuator computer readable medium includes instructions to verify said digital signature by:
   generating a recovered message digest, said recovered message digest generated by condensing said message digest; and
   verifying said digital signature using a public key corresponding to said private key.

6. The system of claim 1 wherein said intelligent actuator apparatus is configured to transition to a safe state if one or more of said safety messages are not received at said intelligent actuator apparatus on a periodic basis.

7. The system of claim 1 wherein said sensor computer readable medium includes instructions to create, in said first safety certified layer, a message digest based upon said state information, said message digest being signed using a private key in order to generate said digital signature.

8. The system of claim 1 wherein said sensor computer readable medium includes instructions to add, in said first safety certified layer, sequence number information to said state information in connection with said safety message.

9. The system of claim 1 wherein said sensor computer readable medium includes instructions to add, in said first safety certified layer, time stamp information to said state information in connection with said safety message.

10. The system of claim 1 wherein said intelligent sensor apparatus comprises a pressure transducer and said state information includes a pressure state sensed by said pressure transducer.

11. The system of claim 1 wherein said intelligent actuator comprises a safety shutoff valve, and said actuator computer readable medium includes instructions for actuating, in said second safety-certified application, said safety shutoff valve responsive to said safety message.

12. The system of claim 11 wherein said actuator computer readable medium includes instructions for closing, in said second safety-certified application, said safety shutoff valve on failure to receive said safety message within a predefined time period.

13. The system of claim 1 wherein said intelligent sensor apparatus comprises a temperature transducer and said state information includes a temperature state sensed by said temperature transducer.

14. The system of claim 1 wherein said intelligent sensor apparatus comprises a flow transducer and said state information includes a flow state sensed by said flow transducer.

15. The system of claim 1 wherein said intelligent actuator apparatus comprises a shutoff switch, and said actuator computer readable medium includes instruction for actuating, in said second safety-certified application, said shutoff switch responsive to said safety message.

16. The system of claim 1 further comprising a communications network communicatively coupled to said intelligent sensor and said intelligent actuator.

17. The system of claim 16 wherein said communications network comprises a local area network (LAN).

18. The system of claim 17 wherein said LAN comprises an Ethernet network.

19. The system of claim 17 wherein said LAN comprises a Fieldbus network.

20. The system of claim 16 wherein said communications network is a safety-certified network.

21. The system of claim 16 wherein said communications network is a non-safety certified network.

22. A method for fail-safe transmission of safety messages in a network environment comprising:
generating, at an intelligent sensor processor, a safety message and associated digital signature, wherein said safety message is generated in a first safety-certified layer based at least in part on state information received from an intelligent sensor and wherein said first safety-certified layer is operative in a first non-safety certified layer;
sending, via a communications network, said safety message and said digital signature;
receiving said safety message and said digital signature at an intelligent actuator apparatus, said intelligent actuator apparatus including an intelligent actuator processor;
verifying in a second safety-certified layer of said intelligent actuator apparatus, using said intelligent actuator processor, said safety message using said digital signature, wherein said second safety-certified layer is operative in a second non-safety certified layer; and
enabling, responsive to said verifying, an action at said intelligent actuator apparatus, wherein said action is based at least in part on said state information.

23. The method of claim 22 wherein said digital signature is generated in said first safety-certified layer by signing said safety message using a private key associated with said intelligent sensor.

24. The method of claim 23 wherein said safety message is verified using a public key corresponding to said private key.

25. The method of claim 22 wherein said digital signature is generated by:

generating a message digest by condensing said safety message using a hash function; and
signing said message digest using said private key.

26. The method of claim 25 wherein said message digest is based at least in part on said state information.

27. The method of claim 22 wherein said verifying said safety message using a digital signature includes:
generating a recovered message digest by condensing said message digest; and
verifying said digital signature using a public key corresponding to said private key.

28. The method of claim 22 further comprising transitioning the intelligent actuator apparatus to a safe state if one or more of said safety messages are not received at said intelligent actuator apparatus on a periodic basis.

29. The method of claim 22 further comprising generating said safety message based in part on sequence number information.

30. The method of claim 22 further comprising generating said safety message based in part on time stamp information.

31. The method of claim 22 wherein said intelligent sensor apparatus comprises a pressure transducer and said state information includes a pressure state sensed by said pressure transducer.

32. The method of claim 22 wherein said intelligent sensor apparatus comprises a temperature transducer and said state information includes a temperature state sensed by said temperature transducer.

33. The method of claim 22 wherein said intelligent sensor apparatus comprises a flow transducer and said state information includes a flow state sensed by said flow transducer.

34. The method of claim 22 wherein said intelligent actuator comprises a safety shutoff valve, and said action comprises actuating said safety shutoff valve.

35. The method of claim 22 wherein said intelligent actuator comprises a shutoff switch, and said action comprises actuating said shutoff switch.

36. A system for fail-safe transmission of safety messages in a network environment, said system comprising:
an intelligent sensor apparatus including a sensor element and a sensor hardware apparatus configured to provide:
a first safety-certified application;
a first safety-certified layer; and
a first non-safety-certified layer wherein said first safety-certified layer is operative to generate a safety message and associated digital signature based upon state information received from said sensor element; and
an intelligent actuator apparatus disposed to receive said safety message and said digital signature, said intelligent actuator including an actuator element and an actuator hardware apparatus configured to provide:
a second safety-certified application,
a second safety-certified layer, and
a second non-safety-certified layer wherein said second safety-certified layer is operative to use said digital signature in order to verify authenticity of said safety message and thereby enable said actuator element to perform an action in accordance with said state information.

* * * * *

UNITED STATES PATENT AND TRADEMARK OFFICE
CERTIFICATE OF CORRECTION

| | | |
|---|---|---|
| PATENT NO. | : 7,590,848 B2 | Page 1 of 1 |
| APPLICATION NO. | : 10/360896 | |
| DATED | : September 15, 2009 | |
| INVENTOR(S) | : Powers | |

It is certified that error appears in the above-identified patent and that said Letters Patent is hereby corrected as shown below:

On the title page Item (73) The correct name of the Assignee is: Invensys Software Systems Signed and Sealed this Fifth Day of January, 2010

David J. Kappos
*Director of the United States Patent and Trademark Office*